United States Patent
Vazquez et al.

(10) Patent No.: US 11,361,597 B2
(45) Date of Patent: Jun. 14, 2022

(54) METHOD AND SYSTEM FOR MONITORING INTEGRITY OF PEDESTRIAN PROTECTION SYSTEM IN A VEHICLE

(71) Applicant: Continental Automotive Systems, Inc., Auburn Hills, MI (US)

(72) Inventors: Manuel Leopoldo Wario Vazquez, Zapopan (MX); Diego Preciado, Tlajomulco de Zuniga (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 99 days.

(21) Appl. No.: 16/288,233

(22) Filed: Feb. 28, 2019

(65) Prior Publication Data

US 2020/0279442 A1    Sep. 3, 2020

(51) Int. Cl.
| | |
|---|---|
| *G07C 5/08* | (2006.01) |
| *B60Q 9/00* | (2006.01) |
| *G01M 3/32* | (2006.01) |
| *B60R 21/01* | (2006.01) |
| *B60R 21/36* | (2011.01) |

(52) U.S. Cl.
CPC ............... *G07C 5/08* (2013.01); *B60Q 9/00* (2013.01); *B60R 21/01* (2013.01); *B60R 21/36* (2013.01); *G01M 3/3236* (2013.01)

(58) Field of Classification Search
CPC ........ B60Q 9/00; G07C 5/08; B60R 21/0136; B60R 21/01; B60R 21/36; G01L 27/007; G01L 5/0052; G01M 17/007; G01M 3/3236; G01M 17/0078
See application file for complete search history.

(56) References Cited

U.S. PATENT DOCUMENTS

| | | | |
|---|---|---|---|
| 4,067,288 A * | 1/1978 | Saito ................... | B60C 23/0403 340/443 |
| 9,975,510 B2 * | 5/2018 | Foo ......................... | B60R 21/34 |

(Continued)

FOREIGN PATENT DOCUMENTS

| | | |
|---|---|---|
| CN | 101716873 A | 6/2010 |
| CN | 102328630 A | 1/2012 |

(Continued)

OTHER PUBLICATIONS

Rejane B. Santos, Spectral Analysis for detection of Leaks in Pipes Carrying Compressed Air, Chemical Engineering Transactions, vol. 32, 2013 (Year: 2013).*

*Primary Examiner* — Ig T An

(57) ABSTRACT

A method and system of diagnosing the integrity of a sealed air tube of a pedestrian protection system of a vehicle is provided. The method provides the sealed air tube having a pressure sensor connected at each end of the air tube. The air tube is constructed and arranged to be located in front fascia of a vehicle. A processor circuit is electrically connected with the pressure sensors and the processor circuit has a Fast Fourier Transform element. Natural frequencies of a frequency spectrum of the air tube are obtained when no leak is known to be present in in the air tube. Signals from the pressure sensors are transformed into the frequency domain with the Fast Fourier Transform element. A leak is determined to be present in the air tube if frequencies other than the natural frequencies exist in the frequency spectrum of the air tube.

15 Claims, 4 Drawing Sheets

(56) References Cited

U.S. PATENT DOCUMENTS

| | | | |
|---|---|---|---|
| 2004/0020701 A1* | 2/2004 | Aoki | B60R 21/0136 |
| | | | 180/274 |
| 2014/0207330 A1* | 7/2014 | Meir | G01L 27/007 |
| | | | 701/33.9 |
| 2016/0209283 A1* | 7/2016 | Walz | G01M 17/0078 |
| 2016/0320767 A1* | 11/2016 | Brummel | G05B 19/416 |
| 2019/0145313 A1* | 5/2019 | Hirchenhein | F02D 41/2467 |
| | | | 701/102 |

FOREIGN PATENT DOCUMENTS

| | | |
|---|---|---|
| CN | 203743867 U | 7/2014 |
| EP | 2006654 A2 | 12/2008 |
| GB | 1477086 A | 6/1977 |

* cited by examiner

-PRIOR ART-

METHOD AND SYSTEM FOR MONITORING INTEGRITY OF PEDESTRIAN PROTECTION SYSTEM IN A VEHICLE

FIELD

This invention relates to a vehicle pedestrian protection system and, more particularly, to monitoring the integrity of an air tube of the pedestrian system.

BACKGROUND

A conventional pedestrian protection system manufactured by Continental is shown, generally indicated at 10, in FIG. 1. The system 10 includes a sealed air tube 12 having pressure sensors 14 connected with each end thereof. The tube 12 is located in the front fascia or foam block 16 between the bumper 18 and the front end 20 of a vehicle 22 to detect pedestrian impacts by sensing pressure changes within the tube 12. When a vehicle collides with an obstacle such as a pedestrian, the resulting pressure exerted on the tube 12 through the front end 20 and foam block 16 creates a typical waveform that is detected by the two sensors 14 and forwarded to an airbag control unit. The sensors 14 reliably recognize collisions with pedestrians and supplies the safety systems with the information they need to trigger protective measures such as lifting the hood to reduce the risk of severe injury to the pedestrian from hitting the hood and underlying engine block. Currently there is no method to measure the integrity of the air tube 12.

Thus, there is a need to monitor the integrity of an air tube of a pedestrian protection system for a vehicle by sensing if there is any leak in the air tube that can affect pressure measurements.

SUMMARY

An object of the invention is to fulfill the need referred to above. In accordance with the principles of the present invention, this objective is achieved by a method of diagnosing the integrity of a sealed air tube of a pedestrian protection system of a vehicle. The method provides the sealed air tube having a pressure sensor connected at each end of the air tube. The air tube is constructed and arranged to be located in front fascia of a vehicle. A processor circuit is electrically connected with the pressure sensors and the processor circuit has a Fast Fourier Transform element. Natural frequencies of a frequency spectrum of the air tube are obtained when no leak is known to be present in the air tube. Signals from the pressure sensors are transformed into the frequency domain with the Fast Fourier Transform element. A leak is determined to be present in the air tube if frequencies other than the natural frequencies exist in the frequency spectrum of the air tube.

In accordance with another aspect of an embodiment, a pedestrian protection system of a vehicle includes a sealed air tube constructed and arranged to be located in front fascia of a vehicle for detecting pedestrian impact there-with. A first pressure sensor is connected at a first end of the air tube and a second pressure sensor is connected at a second end of the air tube. An electronic control unit has a processor circuit electrically connected with the pressure sensors. The processor circuit has a Fast Fourier Transform element constructed and arranged to transform signals from the pressure sensors into the frequency domain so that frequencies, other than natural frequencies of the air tube, existing in the frequency spectrum of the air tube indicate a leak in the air tube.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF EXEMPLARY EMBODIMENTS

Figure 1:
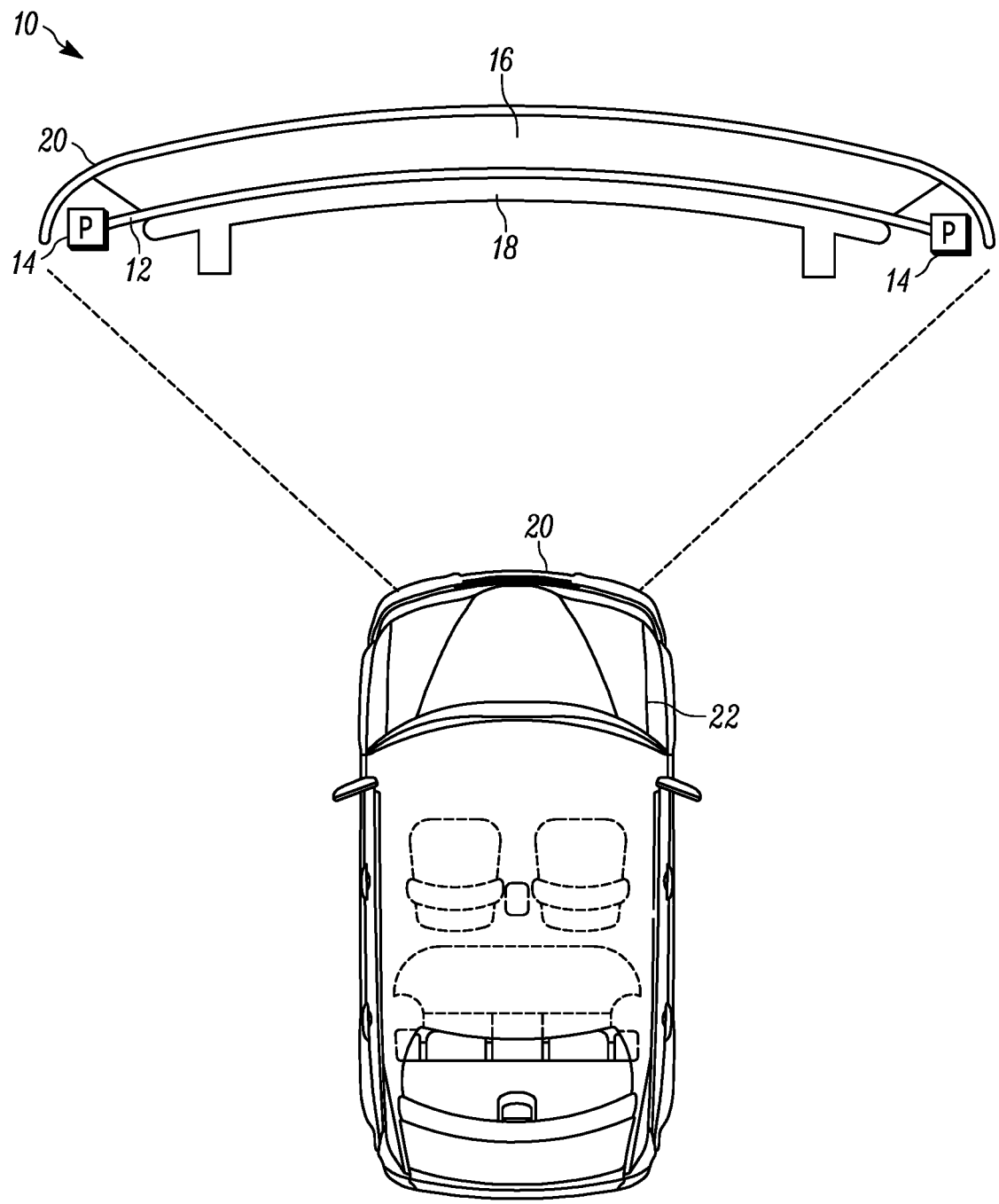
FIG. 1 is a plan view of a vehicle with an enlarged view of a conventional pedestrian protection system associated with the front bumper thereof.
Figure 2:
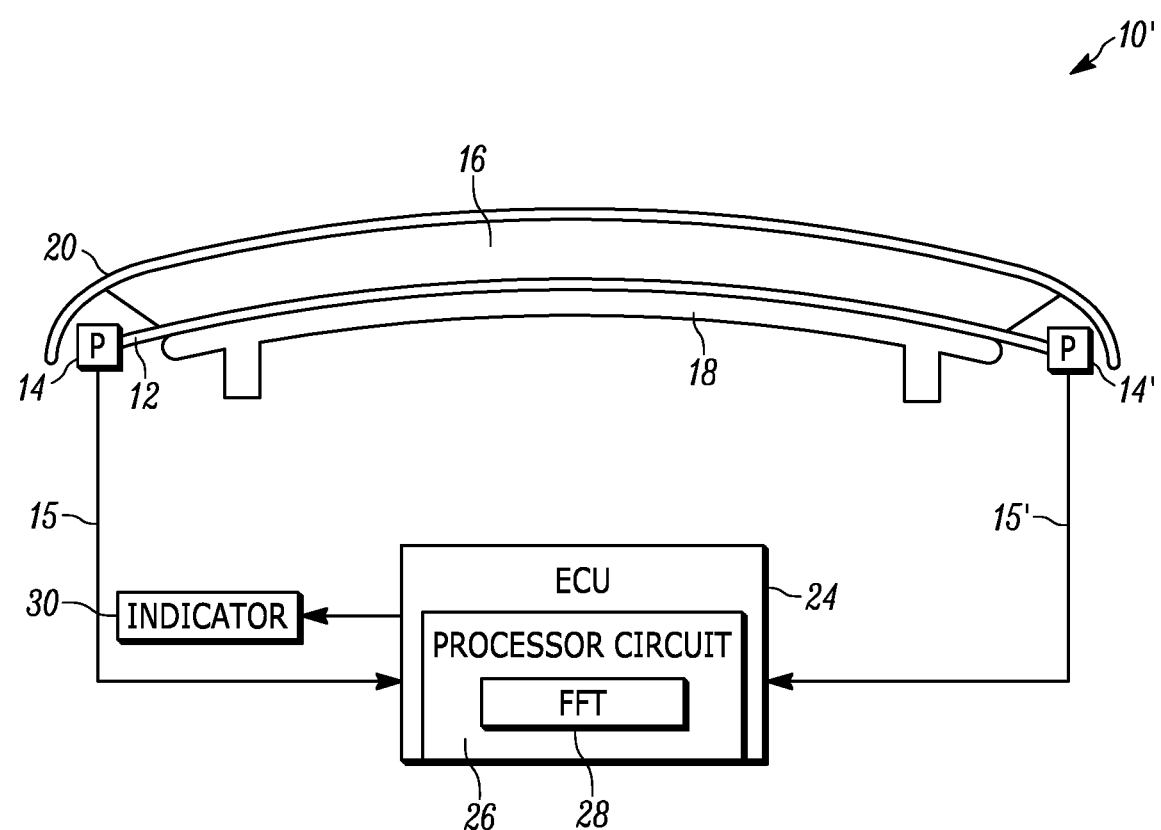
FIG. 2 is a schematic view of a pedestrian protection system provided in accordance with an embodiment.

With reference to FIG. 2, a pedestrian protection system for a vehicle, generally indicated at 10', is provided in accordance with an embodiment. The system 10' includes a sealed air tube 12, preferably of silicone. Pressure sensors 14, 14' are connected preferably at an associated end of the air tube 12. The air tube 12 is located in the front fascia or foam block 16 between the bumper 18 and the front end 20 of a vehicle 22 to detect pedestrian impacts by sensing pressure changes within the tube 12. An electronic control unit (ECU) 24 receives the signals from the pressure sensors 14, 14'. The ECU 24 includes a processor circuit 26 and the ECU 24 can be part of the air bag control unit of the vehicle or can be any other control unit of the vehicle. A leak in the air tube 12 can affect pressure measurements. An object of the embodiment is to diagnose the integrity of the air tube 12.

Figure 3:
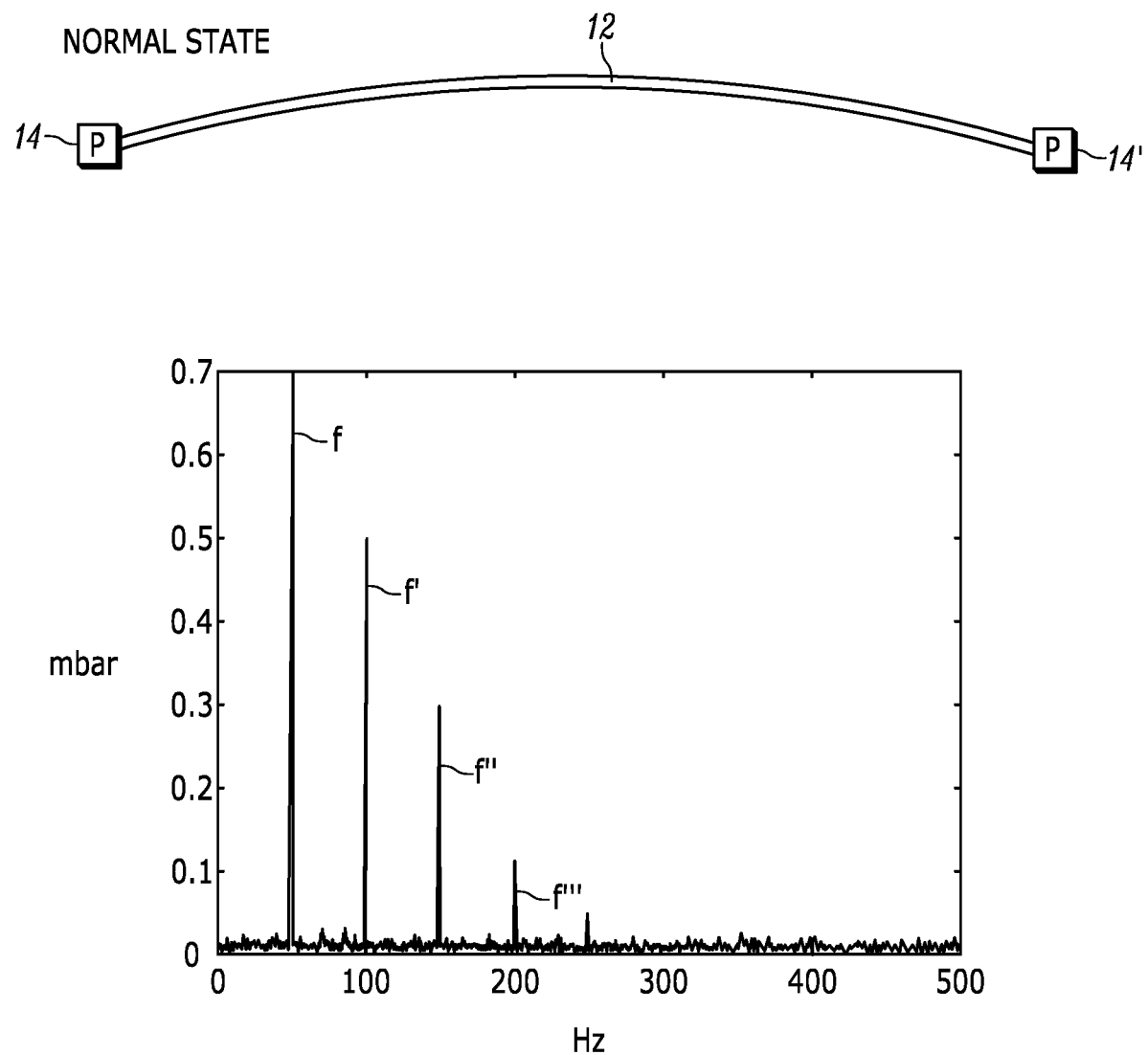
FIG. 3 shows is a graph of frequencies detected by the system of FIG. 2 during a normal state of the system, shown only harmonics of the natural frequency due to the length of the air tube.

The air tube 12 can be considered a one-dimensional cavity where natural frequencies are harmonics and determined by the length of the tube. Even if there is no impact on the air tube 12, as shown in FIG. 3, in a normal state of the tube 12, vibrations will occur due to driving conditions. The frequencies detected with a fast Fourier transform (FFT) are expected frequencies f, f', f'', f''' which are only harmonics of the natural frequency. If desired, these natural frequencies can be filtered out.

To diagnose the integrity of the air tube 12, the frequency spectrum thereof is analyzed by the use of the pressure sensors 14 and 14' and with fast Fourier transform (FFT) element 28 of processor circuit 26. The FFT element 28 transforms the pressure signals 15, 15' to frequency values so as to be further processed in the frequency domain. Thus, it is possible to identify frequencies out of the expected spectrum that can be an indication of a leak in the tube 12. Gain amplifiers can be employed to amplify the pressure signals if desired.

Figure 4:
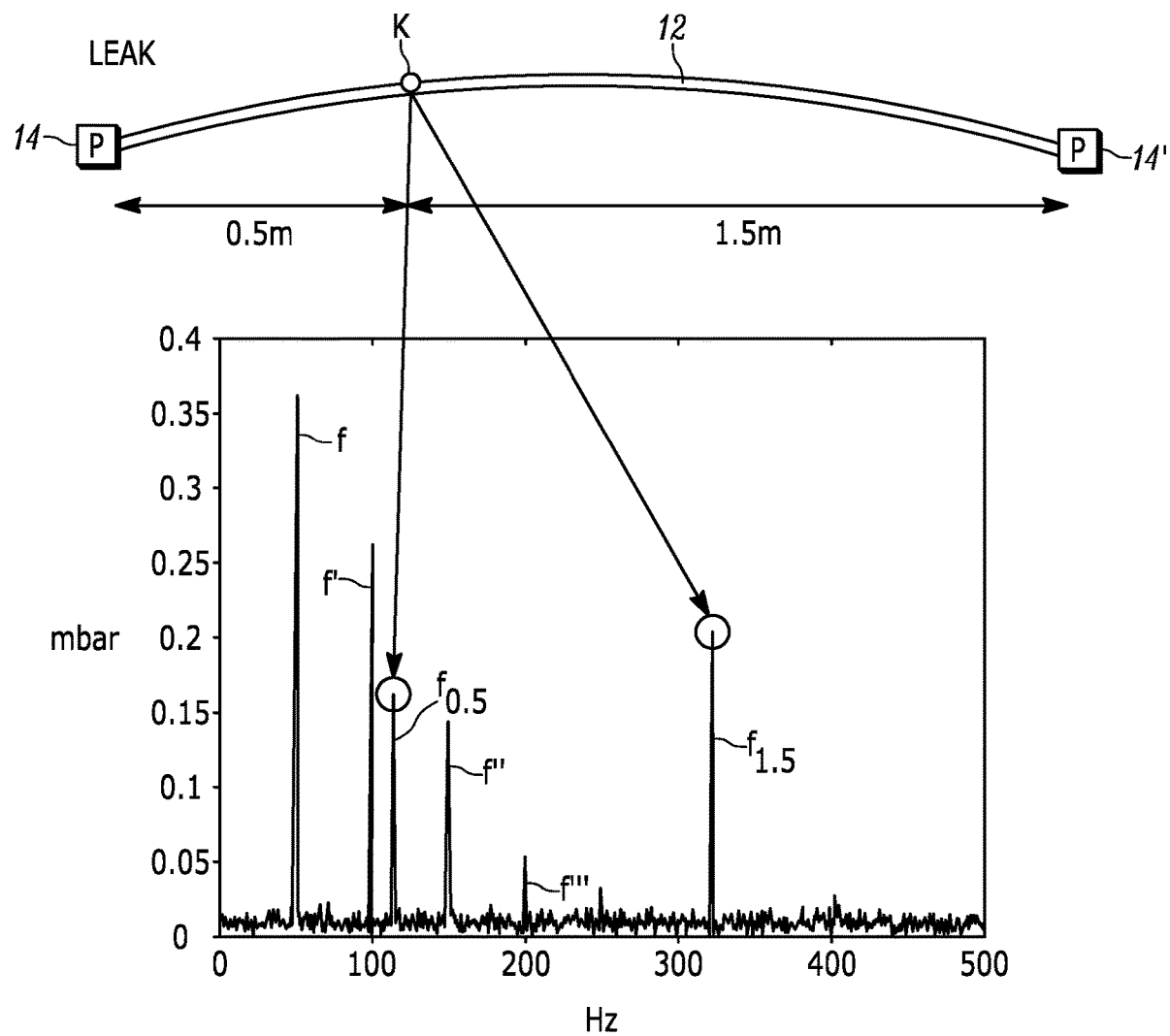
FIG. 4 shows a graph of the harmonic frequencies of FIG. 3 together with different frequencies calculated by the system of FIG. 2 indicating a leak in the air tube.

With reference to FIG. 4, since two frequencies $f_{0.5}$ and $f_{1.5}$ are present in the frequency spectrum other than the natural frequencies f, f', f'', f''', a leak (K) is present in the air tube 12. The pressure sensors 14 and 14' detect the leak (K) in the air tube 12 and the FFT element 28 transforms the pressure signals 15, 15' to the frequency domain. In the embodiment, the leak (K) is located at a distance of 0.5 m from the sensor 14 and 1.5 m from sensor 14'. The leak frequencies $f_{0.5}$ and $f_{1.5}$ are calculated by a processor circuit 26 of the ECU 24 as follows:

$$f_n = n\frac{S}{2L}$$

$$f_{0.5} = n\frac{S}{2L} = \frac{1*343 \text{ m/s}}{2*0.5 \text{ m}} = 343 \text{ Hz}$$

$$f_{1.5} = n\frac{S}{2L} = \frac{1*343 \text{ m/s}}{2*1.5 \text{ m}} = 114.3 \text{ Hz}$$

Where:
  $f_n$=signal frequency
  n=natural number
  S=sound speed
  L=Length of the tube Once a leak (K) is determined, the ECU 24 can indicate such a leak by, for example, by activating an indicator 30 such as illuminating a warning light or by causing a sound to be provided to warn the driver of the vehicle. The indicator can be associated with the instrument cluster of the vehicle. The leak (K) can then be fixed by a service provider of the air tube 12 can be replaced.

Thus, the system 10' provides an inexpensive solution of air tube leak detection since there are no major extra components are needed, requiring only the implementation of a new algorithm executed by the processor circuit 26 of the ECU 24 and the provision of an indicator to warn a user of the leak.

The operations and algorithms described herein can be implemented as executable code within the micro-controller or ECU 24 having processor circuit 26 as described, or stored on a standalone computer or machine readable non-transitory tangible storage medium that are completed based on execution of the code by a processor circuit implemented using one or more integrated circuits. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a micro-processor circuit (not shown) and implemented using one or more integrated circuits, where execution of executable code stored in an internal memory circuit causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit can be implemented, for example, using a non-volatile memory such as a programmable read only memory (PROM) or an EPROM, and/or a volatile memory such as a DRAM, etc.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

What is claimed is:

1. A method of diagnosing the integrity of a sealed air tube of a pedestrian protection system of a vehicle, the method comprising: transforming signals corresponding to pressure within the sealed air tub detected by pressure sensors coupled to each end of the air tube into a frequency domain by Fast Fourier Transform, determining that a frequency other than a natural frequency of the air tube exists in a frequency spectrum of the air tube based on the signals transformed into the frequency domain; determining presence of a leak in the air tube in response to determining the frequency other than the natural frequency of the air tube exists in the frequency spectrum of the air tube, and determining a position on the air tube of the leak based on the frequency other than the natural frequency of the air tube.

2. The method of claim 1, further comprising indicating the presence of the leak to a user of the vehicle.

3. The method of claim 2, wherein indicating the presence of the leak to the user comprises illuminating a warning light in the vehicle.

4. The method of claim 2, wherein indicating the presence of the leak to the user comprises causing a sound to be provided to warn the user.

5. The method of claim 1, wherein the air tube is provided from silicone.

6. The method of claim 1, wherein the position on the air tube of the leak comprises a distance from a pressure sensor among the pressure sensors.

7. The method of claim 1, wherein determining the position on the air tube of the leak based on the frequency other than the natural frequency of the air tube comprises for the signals detected by each of the pressure sensors determining the position on the air tube of the leak according to the following Equation:

$$f_n = n\frac{S}{2L}$$

wherein f~ is a signal frequency, n is a natural number, S is a sound speed, and L is a length of the air tube.

8. A pedestrian protection system of a vehicle, the pedestrian protection system comprising: a sealed air tube constructed and arranged to be located in front fascia of a vehicle for detecting pedestrian impact therewith; a first pressure sensor connected at a first end of the air tube; a second pressure sensor connected at a second end of the air tube; and an electronic control unit having a processor circuit electrically connected with the first pressure sensor and the second pressure sensor, the processor circuit configured to transform signals corresponding to pressure within the sealed air tube detected by the first pressure sensor and the second pressure sensor into a frequency domain by Fast Fourier Transform, determine that a frequency other than a natural frequency of the air tube exists in a frequency spectrum of the air tube based on the signals transformed into the frequency domain, determine presence of a leak in the air tube in response to determining the frequency other than the natural frequency of the air tube exists in the frequency spectrum of the air tube; and determine a position on the air tube of the leak based on the frequency other than the natural frequency of the air tube.

9. The pedestrian protection system of claim 8, wherein the electronic control unit is part of an air bag control unit of the vehicle.

10. The pedestrian protection system of claim 8, further comprising an indicator electrically coupled with the electronic control unit and constructed and configured to indicate the presence of the leak to a user of the vehicle.

11. The pedestrian protection system of claim 10, wherein the indicator is warning light in the vehicle.

12. The pedestrian protection system of claim 10, wherein the indicator is a speaker configured to provide a sound to warn the user.

13. The pedestrian protection system of claim 8, wherein the air tube is provided from silicone.

14. The pedestrian protection system of claim 10, wherein the position on the air tube of the leak comprises a distance from the first pressure sensor of the second pressure sensor.

15. The pedestrian protection system of claim 8, wherein the electronic control unit is configured to determine the position on the air tube of the leak based on the frequency other than the natural frequency of the air tube by, for the signals detected by each of the first pressure sensor and the second pressure sensor, determining the position on the air tube of the leak according to the following Equation:

$$f_n = n\frac{S}{2L}$$

wherein $f_\sim$ is a signal frequency, n is a natural number, S is a sound speed, and L is a length of the air tube.

* * * * *